Sept. 30, 1958 A. E. FOGELBERG, JR., ET AL 2,854,630
PEAK DETECTION
Filed April 21, 1953
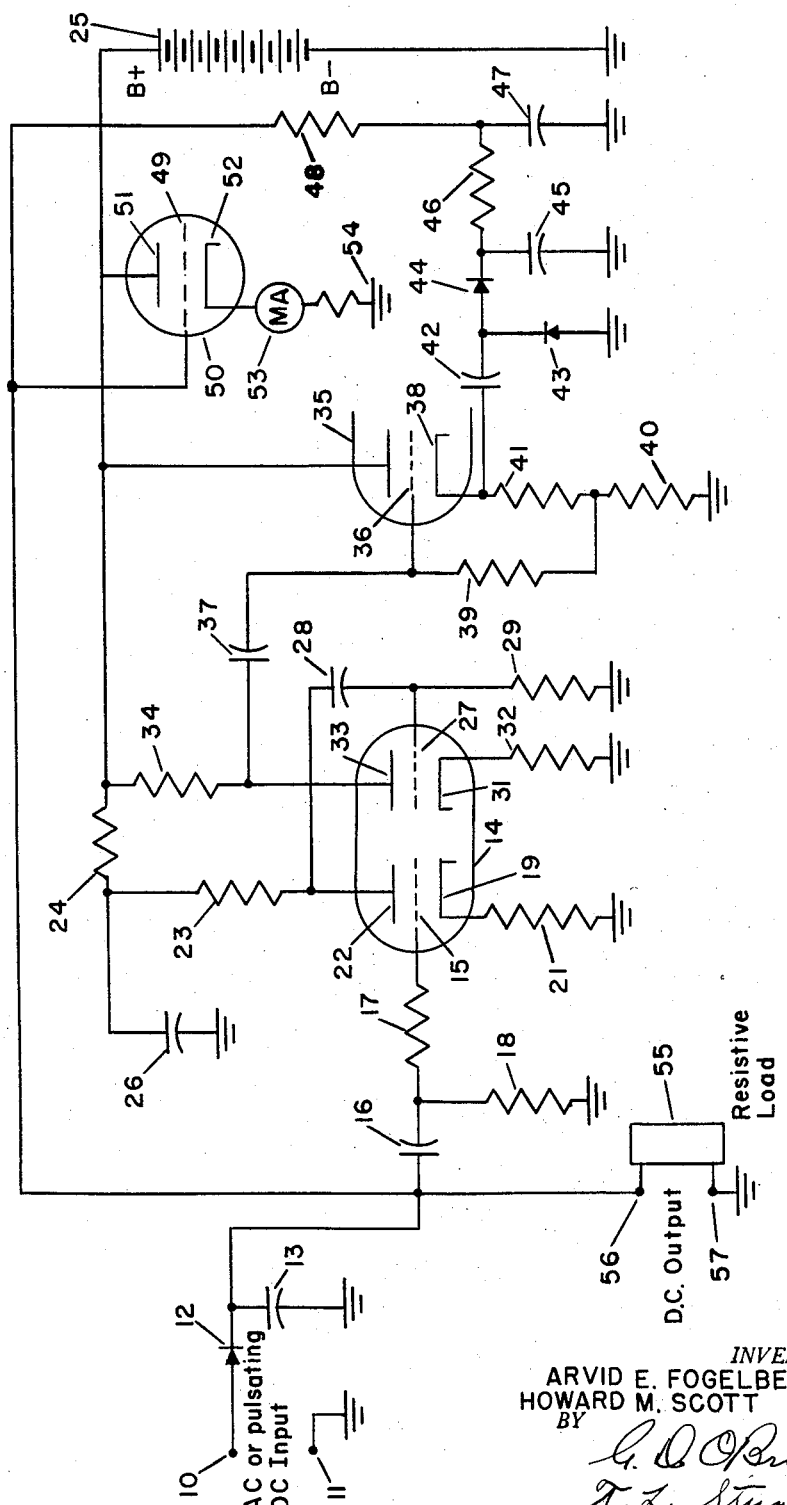
INVENTOR.
ARVID E. FOGELBERG, JR.
HOWARD M. SCOTT
BY
G. O'Brien
F. L. Styner ATTYS.

2,854,630

PEAK DETECTION

Arvid E. Fogelberg, Jr., Camden, N. J., and Howard M. Scott, Philadelphia, Pa., assignors, by mesne assignments, to the United States of America as represented by the Secretary of the Navy Application April 21, 1953, Serial No. 350,125

4 Claims. (Cl. 324—103)

The present invention relates to an improved circuit of a peak detector for producing a voltage in response to a pulsating signal which is combined with the signal voltage to maintain the peak voltage of a pulsating direct current or a transient alternating current signal in the output of the circuit constant over a wide range of frequencies.

Prior art devices of this type have presented the difficulty that if the circuit were sensitive enough to respond to low frequency pulses, the time constant was too long to permit an accurate response to high frequency signals, or if the sensitivity is reduced to permit response to high frequency signals the circuit will not respond accurately to low frequency signals.

In general the circuit operates to rectify an incoming pulsating signal for charging a storage condenser and providing a control voltage for an amplifier. The amplifier responds inversely as the variation rate of the incoming signal and produces an output which is fed back into and combines with the input signal to maintain the storage condenser charged to the peak voltage of the incoming signal. If a milliammeter is connected in the cathode-anode circuit of a vacuum tube voltmeter, whose grid is connected to the positive side of the storage condenser, the device, with proper calibration, becomes a peak reading vacuum tube voltmeter.

It is an object of this invention to provide an electrical circuit capable of accurately responding to the peak voltages of a signal over a wide range of pulse frequencies.

Another object of this invention is to provide an improved vacuum tube voltmeter circuit.

Other objects and many of the attendant advantages of this invention will be readily appreciated by those skilled in the art as the invention becomes better understood by reference to the following detailed description and accompanying drawings of a preferred embodiment in which the figure is a circuit diagram of the invention employed as a vacuum tube voltmeter.

Referring now to the drawing, wherein like reference characters designate like or corresponding parts throughout, there is shown a pair of input terminals 10 and 11, one of which may be grounded. In the illustration it is terminal 11 which is grounded. Terminal 10 feeds into a rectifier 12, which, for example, may be either of the dry disc type or of the vacuum tube type, to produce as an output a polarized pulsating current for charging condenser 13, one side of which, in this example, is grounded. The output of rectifier 12 is also applied through blocking condenser 16 and grid resistor 17 to control the grid 15 of the amplifier tube 14. The grid 15 is connected to ground through resistor 17 and grid biasing resistor 18 and is biased in respect to the cathode 19 by resistor 21, as is usual in such amplifiers. The plate 22 of tube 14 is connected through load resistors 23 and 24 to a source of high potential, 25, and, according to an important characteristic of this invention, also has a by-pass to ground through condenser 26 which is connected between resistors 23 and 24 to shunt a portion of the plate load resistance in this stage and thereby attenuate amplification of signal as the frequency increases. The second grid 27 of tube 14 is connected through blocking condenser 28 to the plate 22 and through the usual biasing resistor 29 to ground and is biased with respect to the second cathode 31 by resistor 32. The second plate 33 is connected to the source of high potential 25 through resistor 34 and is connected to the grid 36 of tube 35 through blocking condenser 37. The grid 36 is connected through resistor 39, to the cathode 38 of tube 35 intermediate cathode resistors 41 and 40, the cathode resistor 40 being connected to ground. The cathode 38 is connected as a cathode follower to one side of condenser 42, the other side of which is connected to the positive side of rectifier 43, which together with condenser 42 clamp the signal voltage with its most negative point to ground. Condenser 42 is also connected to the negative side of rectifier 44. The positive side of rectifier 44 is connected through condenser 45 to ground and forms therewith a detector for the clamped voltage. The output of this detector is fed to resistor 46, which is connected to ground through condenser 47 and is also connected through a resistor 48 to the positive side of condenser 13 and rectifier 12, to maintain the charge on condenser 13 at the peak value of the incoming signal. If the device is used as a vacuum tube voltmeter, the resistor 48 is also connected to the grid 49 of a tube 50 whose plate 51 is connected to the positive side of the battery 25 and whose cathode 52 is connected through a milliammeter 53 and a resistor 54 to ground. In use there would be a high resistance load 55 connected across output terminals 56 and 57.

In operation, a signal of varying frequency and pulse width, for example from 60 cycles to 70 kilocycles, is applied across terminal 10 and 11 from which it is fed into the rectifier 12. The output of the rectifier is a pulsating voltage having a definite polarity which is used to charge storage condenser 13 to an average voltage which is directly proportional to the pulse repetition rate of the signal. Condenser 13 is responsive to the signal variations by reason of its discharging through the load 55 placed across terminals 56 and 57. This pulsating voltage is also impressed through condenser 16, to control the grid 15 of tube 14. The pulsating signal on grid 15 is amplified at plate 22, but resistor 24 and condenser 26 produce a decrease in the amplitude of the higher pulse repetition rate signals for the purpose of compensating for an opposite effect at rectifier 44 and condenser 45. The amplified signal from plate 22 is applied to grid 27 through condenser 28 to produce a further amplification of the signal at plate 33. The amplified signal from plate 33 is used to control the grid 36 of tube 35, which is connected as a cathode follower. Resistances 23 and 34 are plate load resistors for tube 14.

Resistor 41 is the cathode bias resistor and in conjunction with resistor 40 forms the cathode load resistance for tube 35. Rectifier 43 with condenser 42 form a clamp which holds the most negative point of the signal to ground potential so as to insure proper detection for all pulse repetition rates of the signal. Rectifier 44 and condenser 45 detect the clamped signal, positively and in magnitude directly proportional to the pulse repetition rate, which is then applied to condenser 13 through the network of resistor 46, condenser 47 and resistor 48. This is a filter network designed to apply to condenser 13 a D. C. voltage equivalent to the peak-to-peak voltage at the output of the amplifier. The feed-back voltage from 44 and 45 produces a more positive voltage at 12 and 13, thus compensating for the sensitivity of 12 and 13 to pulse repetition rate.

A discharge path for condenser 45 is provided through the back resistance of diodes 43 and 44 or through resistors 46 and 48 and the load 55 connected across terminals 56 and 57.

Since the resulting voltage across condenser 13 is equivalent to the peak voltage of the incoming signal, the insertion of the milliammeter 53 in the cathode-anode circuit of the tube 50 results in a peak-reading vacuum tube voltmeter covering the same range of signal values claimed for the circuits as a peak detector.

Obviously many modifications of the present invention are possible in the light of the above teachings. It is therefore to be understood that the invention may be practiced otherwise than specifically described.

What is claimed is:

1. A peak detector for detecting the peak voltage of a pulsating voltage signal comprising; an input circuit having grounded and ungrounded leads carrying said pulsating voltage signal; a rectifier in the ungrounded lead of said input circuit; a storage capacitor connected between the ungrounded lead at the output side of said rectifier and ground; a multi-stage amplifier coupled to the ungrounded lead at the output side of said rectifier and having one stage connected to a capacitor for attenuating the amplified voltage signal proportional to increases in frequency of the input pulsating voltage signal; a cathode follower connected to the output of the multi-stage amplifier; a clamping circuit coupled to the cathode output of said cathode follower for clamping the output voltage signal of said cathode at a predetermined value; a detector coupled in serial relation to said clamping circuit for detecting the clamped output voltage signal positively and in magnitude directly proportional to the voltage signal repetition rate; a single feedback circuit coupled from said detector through a filter network to the ungrounded lead input of said storage capacitor for feeding the direct-current output of said detector back into the circuit to maintain said storage capacitor at the peak voltage of said incoming pulsating voltage; output terminals coupled one to the ungrounded lead input of said storage capacitor and the other to ground, said output terminals having a high impedance load thereacross for discharging said storage capacitor thereby making said storage capacitor responsive to the variations of said incoming pulsating voltage; and a peak voltage indicating means consisting of a triode vacuum tube having its grid coupled to the ungrounded lead input of said storage capacitor and having a milliammeter connected in series with a cathode resistor between the cathode of said triode tube and said grounded lead whereby the peak voltage of the incoming pulsating voltage will be indicated.

2. A peak detector as claimed in claim 1 in which the rectifier is a dry-disc type rectifier and in which the amplifier has a blocking condenser in the input circuit between the first stage and the storage capaictor.

3. A peak detector as claimed in claim 2 in which the detector for the clamping circuit consists of a dry-disc rectifier in series with the output of the clamp circuit and a capacitor between the output of the rectifier and ground.

4. A peak detector as claimed in claim 1 in which the clamp circuit comprises a condenser connected in series in cathode follower circuit output and a dry-disc rectifier connected between the low side of the condenser and ground to conduct from ground to the low side of the condenser.

References Cited in the file of this patent

UNITED STATES PATENTS

| 1,799,683 | Geiger | Apr. 7, 1931 |
| 2,058,565 | Case | Oct. 27, 1936 |
| 2,144,605 | Beers | Jan. 24, 1939 |
| 2,565,542 | Arnold | Aug. 28, 1951 |
| 2,708,736 | Creveling et al. | May 17, 1955 |

FOREIGN PATENTS

| 116,108 | Australia | Nov. 3, 1942 |

OTHER REFERENCES

Creveling et al: An Automatic-Slideback Peak Voltmeter, Proc. I. R. E., vol. 35, No. 2, pages 208–211 (February 1947).